United States Patent Office 3,767,683
Patented Oct. 23, 1973

3,767,683
2-[(ESTRA - 1,3,5-(10)-TRIEN-2-YL)THIO]-2-METHYL-PROPIONIC ACID DERIVATIVES
John W. Cusic and James R. Deason, Skokie, Ill., assignors to G. D. Searle & Co., Chicago, Ill.
No Drawing. Filed Aug. 30, 1971, Ser. No. 176,313
Int. Cl. C07c 169/12
U.S. Cl. 260—397.1  3 Claims

ABSTRACT OF THE DISCLOSURE

Estratrienylthio-propionic acid compounds are described herein. They are prepared starting from the appropriate mercapto compounds and are useful as antiatherogenic agents.

The present invention relates to a group of new estratrienyl compounds and to the use of these compounds for pharmacological purposes as a result of their antiatherogenic activity. In particular, the present invention relates to compounds having the following general formula

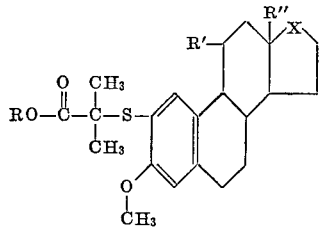

wherein R is selected from the group consisting of hydrogen and lower alkyl; R' is selected from the group consisting of hydrogen and methyl; R" is selected from the group consisting of methyl and ethyl; X is selected from the group consisting of carbonyl and radicals of the formula

Y being a member of the class consisting of hydrogen and lower alkanoyl and Z being a member of the class consisting of hydrogen and lower alkyl.

The lower alkyl radicals referred to above contain up to 6 carbon atoms and can be illustrated by methyl, ethyl, propyl, and butyl. The lower alkanoyl radicals referred to above likewise contain up to 6 carbon atoms and can be illustrated by acetyl, propionyl, and butyryl.

When R in the above formula is H, the compounds are carboxylic acids. Salts of these acids, such as the sodium or the potassium salt, can be prepared and are equivalent to the free acid for the purposes of this invention.

The compounds of the present invention are conveniently prepared by starting with the appropriate substituted 2-mercaptoestratriene. This mercaptan is reacted with a compound of the formula

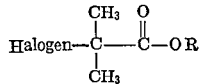

wherein R is lower alkyl and halogen is preferably bromine. The process is carried out by refluxing the reactants with a strong base such as potassium hydroxide in a solvent such as ethanol. The above process is most suitable for the preparation of those compounds in which R is alkyl and in which there is a hydroxy substituent at the 17-position of the steroid nucleus. However, it can also be used when R is a metal cation. This can then be converted to the free acid or ester by standard procedures. Once such a 17-hydroxy compound is prepared, it can be converted to the 17-ester by reaction with the appropriate acid anhydride or acid chloride or the 17-hydroxy group can be oxidized to give the corresponding 17-oxo derivative.

The 3-substituents can be converted to the free acid by saponification of the ester and this acid is useful for the preparation of other esters in that it can be reacted with diazomethane to give the methyl ester, or, when the 17-hydroxy group is esterified, the acid can be converted to the acid chloride with a reagent such as thionyl chloride and this can then be reacted with alcohols to give corresponding new esters.

The present compounds are also useful as antiatherogenic agents. Thus, they reduce plasma cholestrol and triglyceride levels. This is demonstrated by the following test procedure. The test compound is dissolved in acetone and mixed into powdered laboratory chow at a level of 0.2 percent in the diet and the solvent is allowed to evaporate. The food is then fed to male rats (Charles River strain, 250–300 gm., 8 per group) ad libitum for a period of 5 days. Control animals receive the powdered diet alone. On the morning of the sixth day, the animals are randomly anesthetized with ether and blood samples are withdrawn from the heart. Plasma cholesterol is measured by the method of Block et al., Clinical Chemistry, 12, 681 (1966); and plasma triglycerides are determined automatically according to the method of Nobel and Campbell, Clinical Chemistry, 16, 166 (1970). The results of the plasma analyses of the test groups are compared with those from the concomitantly run control group and these comparisons are statistically evaluated by the method of Wilcoxon. A compound that produces a statistically significant reduction in both plasma cholesterol and plasma triglycerides is considered active in this test. When ethyl 2-[(17β-hydroxy - 3 - methoxyestra-1,3,5(10)-trien-2-yl)thio]-2-methylpropionic acid was tested in this way at a level of 0.2 percent in the diet, the compound was found to be active.

The following examples are presented to further illustrate the present invention. They should not be construed as limiting it in spirit or in scope. In these examples, quantities are indicated in parts by weight and temperatures are indicated in degrees centigrade (° C.).

EXAMPLE 1

A mixture of 9.6 parts of 2-mercapto-3-methoxyestra-1,3,5(10)-trien-17β-ol, 10 parts by volume of ethyl 2-bromo-2-methylpropionate, 2.0 parts of potassium hydroxide, and 160 parts of ethanol is heated under reflux for 2 hours and then filtered to remove some insoluble material. The resulting filtrate is diluted with ice water and the precipate which forms is separated by filtration and recrystallized from aqueous methanol. During the crystallization, some insoluble disulfide forms first and is removed by filtration. The second crop of solid is the desired ethyl ester of 2-[(17β-hydroxy-3-methoxyestra-1,3,5(10)-trien-2-yl)thio]-2-methylpropionic acid melting at about 118–120° C. The material is purified further by dissolving it in benzene and chromatographing the solution on silica gel. The column is eluted with benzene containing increasing concentrations of ethyl acetate. The solvent is evaporated from the appropriate fraction and the resulting residual solid is recrystallized from methanol to give a solid melting at about 122–123° C. The compound has the following formula

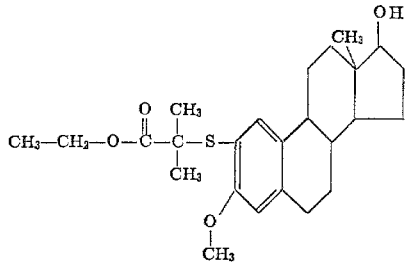

EXAMPLE 2

A solution is prepared from 7 parts of the ethyl ester of 2-[(17β-hydroxy-3-methoxyestra-1,3,5(10)-trien-2-yl)thio]-2-methylpropionic acid, 54 parts of acetic anhydride and 50 parts of pyridine. The mixture is allowed to stand at room temperature for 24 hours and water is added to cause precipitation. The gum which forms is separated and is recrystallized first from ethanol and then from aqueous acetone to give the ethyl ester of 2-[(17β-acetoxy-3-methoxyestra-1,3,5(10)-trien-2-yl)thio] - 2 - methylpropionic acid melting at about 125–128° C.

EXAMPLE 3

To a solution of 12.8 parts of the ethyl ester of 2-[(17β-hydroxy - 3 - methoxyestra-1,3,5(10)-trien-2-yl)thio]-2-methylpropionic acid in 200 parts of acetone there is added, with stirring, 10 parts by volume of 8 N Jones reagent (chromic acid and sulfuric acid in water). This is an excess of the reagent. The excess oxidant is reduced by the addition of 2-propanol and the mixture is diluted with 1000 parts of water. The precipitate which forms is separated by filtration, washed with water, and recrystallized from aqueous acetone to give the ethyl ester of 2-[(17-oxo - 3 - methoxyestra-1,3,5(10)-trien-2-yl)thio]-2-methylpropionic acid melting at about 120–122° C. Chromatography of a benzene solution of the product on silica gel with elution with 2% (v./v.) ethyl acetate in benzene gives, after evaporation of the solvent from the eluate and recrystalliation of the resulting residue from aqueous acetone, a solid melting at about 117–120° C.

EXAMPLE 4

A solution of 13 parts of the ethyl ester of 2-[(17β-hydroxy-3-methoxyestra-1,3,5(10)-trien - 2 - yl)-thio]-2-methylpropionic acid, 2 parts of potassium hydroxide, 10 parts of water, and 120 parts of methanol is refluxed for 5 hours and then allowed to stand at room temperature for 48 hours. Thin layer chromatography still showed some starting material and an additional 1 part of potassium hydroxide is added and refluxing is resumed for another 4 hours. The alkaline solution is then diluted with water and extracted with chloroform. The aqueous layer is then made acid with hydrochloric acid and extracted with chloroform. The combined organic extracts are washed with water and dried and the solvent is evaporated to leave a residual solid. This is crystallized twice from benzene to give 2-[(17β-hydroxy - 3 - methoxyestra-1,3,5(10)-trien-2-yl)thio]-2-methylpropionic acid solvated with ½ mole of benzene. This product melts at about 125–130° C. with decomposition.

EXAMPLE 5

2.0 parts of 2-[(17β-hydroxy-3-methoxyestra-1,3,5(10)-trien-2-yl)thio]-2-methylpropionic acid, as obtained in Example 4, is esterified with an excess of diazomethane in 140 parts of ether. The diazomethane is prepared by the reaction of potassium hydroxide with N-nitrosomethylurea. Excess diazomethane is decomposed with acetic acid and the solvent is evaporated to leave a residual solid. This is recrystallized from aqueous methanol to give the methyl ester of 2-[(17β-hydroxy-3-methoxyestra-1,3,5(10)-trien-2-yl)thio]-2-methylpropionic acid melting at about 150–151° C.

EXAMPLE 6

A solution of 0.85 part of the methyl ester of 2-[(17β-hydroxy-3-methoxyestra - 1,3,5(10) - trien-2-yl)thio]-2-methylpropionic acid, 5 parts of acetic anhydride and 5 parts of pyridine is allowed to stand at room temperature for 65 hours and then poured into ice water. The precipitate which forms is separated by filtration, washed with water, and recrystallized from methanol to give the methyl ester of 2-[(17β-acetoxy-3-methoxyestra-1,3,5(10)-trien-2-yl)thio]-2-methylpropionic acid melting at about 155–156° C. This compound has the following formula

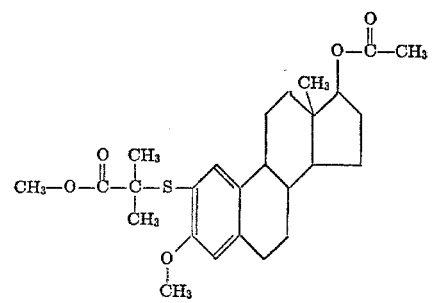

EXAMPLE 7

A solution of 10.5 parts of 2-[(17β-hydroxy-3-methoxyestra-1,3,5(10)-trien-2 - yl)thio]-2-methylpropionic acid as obtained in Example 5, 2.1 parts of acetyl chloride and 63 parts of acetic acid is allowed to stand at room temperature for 2 hours and then poured into ice water. The precipitate which forms is separated by filtration, washed with water and recrystallized from acetone to give 2-[(17β-acetoxy-3-methoxyestra-1,3,5(10)-trien-2-yl)thio]-2-methylpropionic acid melting at about 205–207° C.

EXAMPLE 8

A solution of 1.7 parts of 2-[(17β-acetoxy-3-methoxyestra-1,3,5(10)-trien-2-yl)thio] - 2-methylpropionic acid and 16 parts of thionyl chloride is heated under reflux for 30 minutes. The excess thionyl chloride is removed by distillation and the residue is first dissolved in warm 1-propanol and then stored at about 0° C. overnight. The resulting solution is diluted with ice water and a gum forms. This is dissolved in benzene and chromatographed on alumina. The first few fractions obtained by elution with 10% ethyl acetate in benzene are combined, the solvent is evaporated, the residue is recrystallized from methanol to give the propyl ester of 2-[(17β-acetoxy-3-methoxyestra-1,3,5(10) - trien-2-yl)thio]-2-methylpropionic acid melting at about 95–100° C.

EXAMPLE 9

A solution of 24.0 parts of 3-methyl-11β-methylestra-1,3,5(10)-trien-17β-ol, 108 parts of acetic anhydride, and 98 parts of pyridine is heated on a steam bath for 1 hour and then poured onto about 800 parts of ice water. The resulting mixture is stirred for a few minutes before it is filtered to separate the solid. This is washed with water and dried overnight in a vacuum oven at about 60° C. to give 17β-acetoxy-3-methoxy-11β-methylestra-1,3,5(10)-triene. This material melts at about 166–167° C. after recrystallization from ethanol.

To a solution of 6.9 parts of 17β-acetoxy-3-methoxy-11β-methylestra-1,3,5(10)-triene in 150 parts of chloroform at −5 to 0° C. under nitrogen, there is added 30 parts by volume of chlorosulfonic acid over a period of about 5 minutes. The mixture is then stirred for one hour at −5 to 0° C. before it is cautiously poured onto about 400 parts of stirred cracked ice. The chloroform layer is then separated and the aqueous layer is washed with chloroform. The combined chloroform solutions are dried over magnesium sulfate and filtered and the solvent is evaporated from the filtrate under reduced pressure. The residue is then dried under reduced pressure to give 17β-acetoxy-2-chlorosulfonyl-11β-methyl-3-methoxyestra-1,3,5(10)-triene melting at about 210–225° C. with decomposition.

A solution is prepared from 8.8 parts of 17β-acetoxy-2-chlorosulfonyl-11β - methyl-3-methoxyestra-1,3,5(10)-triene and 180 parts of tetrahydrofuran and this is added over a period of 5 minutes to a stirred slurry of 3.0 parts of lithium aluminum hydride in 45 parts of tetrahydrofuran under nitrogen. This mixture is heated under reflux for 18 hours before it is cooled to room temperature and 100 parts of dilute hydrochloric acid is added cautiously. The organic layer is separated and the aqueous layer is extracted with ether. The combined organic solutions are washed first with dilute hydrochloric acid, then with water, then twice ith saturated aqueous sodium bicarbonate solution, and finally with water. The organic solution is dried over magnesium sulfate and the solvent is evaporated to leave residual crude 2-mercapto compound. This is dissolved in methanol, 2.0 parts of potassium hydroxide is added, and then 30% hydrogen peroxide is added in portions until no more mercapto compound is observed on a thin layer chromatogram of a sample. The resulting precipitate is separated by filtration and recrystallized from acetone to give bis-(17β-hydroxy - 3 - methoxy-11β-methylestra-1,3,5(10)-trien-2-yl) disulfide melting at about 165–168° C.

A solution is prepared from 2.0 parts of bis-(17β-hydroxy-3-methoxy-11β - methylestra-1,3,5(10)-trien-2-yl) disulfide, 23 parts of tetrahydrofuran, 5 parts of water, and 8 parts by volume of tributylphosphine. After 5 minutes, this is treated with a solution of 1 part of potassium hydroxide, 3 parts of ethyl 2-bromo-2-methylpropionate, and 60 parts of methanol and the mixture is refluxed for 1.7 hours and then allowed to stand at room temperature for 2.5 hours. The resulting solution is diluted with water and extracted with ether. The combined ether extracts are washed with 10% aqueous potassium hydroxide solution and then with water before being dried over magnesium sulfate. The solvent is then evaporated under reduced pressure and the residue is dissolved in benzene and chromatographed on silica gel. The column is eluted with increasing quantities of ethyl acetate in benzene, the solvent is evaporated from the appropriate fractions, and the resulting solid is recrystallized from methanol to give the ethyl ester of 2-[(17β-hydroxy-3-methoxy - 11β-methylestra - 1,3,5(10)-trien-2-yl)thio]-2-methylpropionic acid melting at about 124–125° C.

What is claimed is:

1. A compound of the formula:

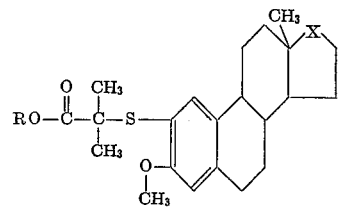

wherein R is selected from the group consisting of hydrogen and lower alkyl; R' is selected from the group consisting of hydrogen and methyl; and X is selected from the group consisting of carbonyl and

wherein Y is selected from the group consisting of hydrogen and lower alkanoyl.

2. A compound according to claim 1 which is ethyl 2-[(17β-hydroxy - 3-methoxyestra - 1,3,5(10)-trien-2-yl) thio]-2-methylpropionate.

3. A compound according to claim 1 which is methyl 2-[(17β-hydroxy - 3-methoxyestra - 1,3,5(10)-trien-2-yl) thio]-2-methylpropionate.

No references cited.

ELBERT L. ROBERTS, Primary Examiner

U.S. Cl. X.R.

260—397.5; 424—238, 243

UNITED STATES PATENT OFFICE
CERTIFICATE OF CORRECTION

Patent No. 3,767,683   Dated October 23, 1973

Inventor(s)  John W. Cusic and James R. Deason

It is certified that error appears in the above-identified patent and that said Letters Patent are hereby corrected as shown below:

Column 5, line 19, "twice ith" should be -- twice with --; and

Column 6, first formula,

" 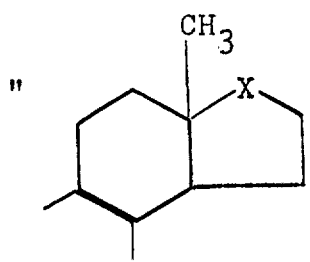 "   should be   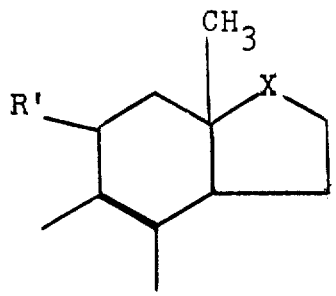

Signed and sealed this 30th day of April 1974.

(SEAL)
Attest:

EDWARD M. FLETCHER, JR.
Attesting Officer

C. MARSHALL DANN
Commissioner of Patents